United States Patent
Yu

(10) Patent No.: US 12,483,055 B2
(45) Date of Patent: Nov. 25, 2025

(54) POWER MANAGEMENT SYSTEM AND POWER MANAGEMENT METHOD

(71) Applicant: Getac Technology Corporation, New Taipei (TW)

(72) Inventor: Chien-Pang Yu, Taipei (TW)

(73) Assignee: Getac Technology Corporation, New Taipei (TW)

( * ) Notice: Subject to any disclaimer, the term of this patent is extended or adjusted under 35 U.S.C. 154(b) by 0 days.

(21) Appl. No.: 18/747,631

(22) Filed: Jun. 19, 2024

(65) Prior Publication Data
US 2025/0062634 A1 Feb. 20, 2025

(30) Foreign Application Priority Data
Aug. 14, 2023 (CN) .......................... 202311021038.2

(51) Int. Cl.
*H02J 7/00* (2006.01)
*H02J 3/00* (2006.01)
*H02J 3/32* (2006.01)

(52) U.S. Cl.
CPC ........ *H02J 7/00712* (2020.01); *H02J 3/0075* (2020.01); *H02J 3/32* (2013.01); *H02J 7/0013* (2013.01); *H02J 7/0048* (2020.01)

(58) Field of Classification Search
CPC ........ H02J 7/00712; H02J 3/0075; H02J 3/32; H02J 7/0013; H02J 7/0048; H02J 3/14; H02J 7/0068; H02J 7/00714; H02J 7/02; H02J 7/342; H02J 7/34; H01M 10/441
USPC .......................................................... 307/24
See application file for complete search history.

(56) References Cited

U.S. PATENT DOCUMENTS

| | | | |
|---|---|---|---|
| 9,304,564 B2 | 4/2016 | Yu et al. | |
| 11,289,936 B2 | 3/2022 | Yang et al. | |
| 2011/0234151 A1 | 9/2011 | Uan-Zo-Li et al. | |
| 2012/0074894 A1 | 3/2012 | Jan-Gee et al. | |
| 2017/0063123 A1* | 3/2017 | Horie | H02J 7/00712 |
| 2021/0135478 A1 | 5/2021 | Schline et al. | |

(Continued)

FOREIGN PATENT DOCUMENTS

| CN | 101071955 A | 11/2007 |
|---|---|---|
| CN | 105027022 B | 1/2019 |
| CN | 110994810 A | 4/2020 |

(Continued)

OTHER PUBLICATIONS

European Search Report issued on Jun. 4, 2025 for EP application No. 24185643.4, 9 pages.

*Primary Examiner* — Richard Tan
(74) *Attorney, Agent, or Firm* — Cooper Legal Group, LLC

(57) ABSTRACT

A power management system and a power management method that are adapted to an electronic device are provided. The power management system includes an alternative current power supply, a first battery, a first charger, a second battery, a second charger, and a control circuit. The control circuit is electrically connected to the first charger and the second charger. The control circuit is configured to detect capacities of the first battery and the second battery, to set a first system power of the first charger as a first rated power, and to set a second system power of the second charger to be less than the first rated power. The control circuit enables a turbo boost mode of the first charger and disables a turbo boost mode of the second charger.

12 Claims, 7 Drawing Sheets

(56) References Cited

U.S. PATENT DOCUMENTS

2023/0054189 A1 2/2023 Nook et al.
2023/0369868 A1 11/2023 Hsu et al.

FOREIGN PATENT DOCUMENTS

TW 201214919 A1 4/2012
TW I790966 B 1/2023

* cited by examiner

POWER MANAGEMENT SYSTEM AND POWER MANAGEMENT METHOD

CROSS-REFERENCE TO RELATED PATENT APPLICATION

This application claims the benefit of priority to China Patent Application No. 202311021038.2, filed on Aug. 14, 2023, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power management system and a power management method, and more particularly to a power management system and a power management method that support a turbo boost mode.

BACKGROUND OF THE DISCLOSURE

Conventionally, only one charger and one battery are disposed in an interior of a computer device. When power consumption of the computer device exceeds a rated power of an alternative current power supply, a control circuit enables a turbo boost mode of the charger. When the power consumption of the computer device does not exceed the rated power of the alternative current power supply, the control circuit disables the turbo boost mode of the charger.

Since the computer device only supports the turbo boost mode of the single charger, a charging speed of the battery for an electronic device is limited.

SUMMARY OF THE DISCLOSURE

In response to the above-referenced technical inadequacies, the present disclosure provides a power management system and a power management method.

In order to solve the above-mentioned problems, one of the technical aspects adopted by the present disclosure is to provide a power management system. The power management system is adapted to an electronic device, and includes an alternative current power supply, a first battery, a first charger, a second battery, a second charger, and a control circuit. The first charger is electrically connected to the first battery, the electronic device, and the alternative current power supply. The second charger is electrically connected to the second battery, the electronic device, and the alternative current power supply. The control circuit is electrically connected to the first charger and the second charger. The control circuit is configured to detect capacities of the first battery and the second battery, to set a first system power of the first charger as a first rated power, and to set a second system power of the second charger to be lower than the first rated power. The control circuit enables a turbo boost mode of the first charger and disables a turbo boost mode of the second charger.

In order to solve the above-mentioned problems, another one of the technical aspects adopted by the present disclosure is to provide a power management method. The power management method is adapted to an electronic device, and includes configuring a control circuit to perform processes: setting a first system power of a first charger to be equal to a first rated power; setting a second system power of a second charger to be less than the first rated power; enabling a turbo boost mode of the first charger; and disabling a turbo boost mode of the second charger.

Therefore, in the power management system and the power management method provided by the present disclosure, when the turbo boost mode of the first charger is enabled, the alternative current power supply does not continue to charge the first battery and the second battery, so that a load can obtain stable power for operation.

The aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
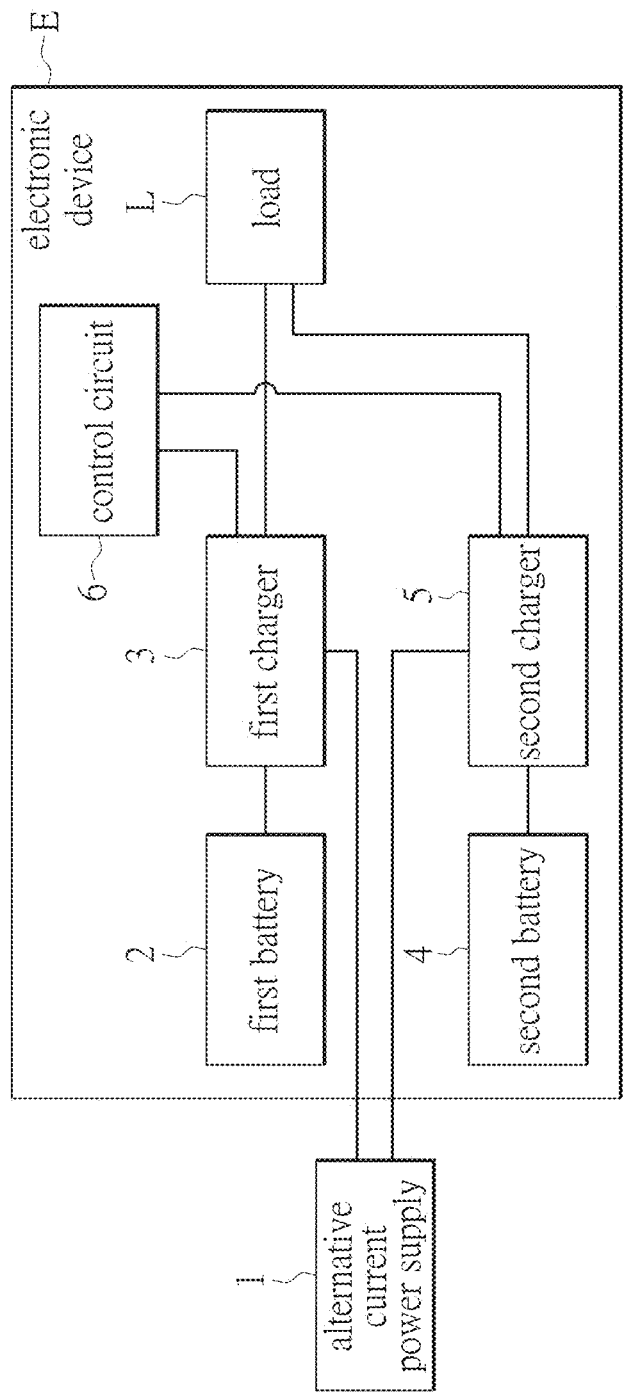
FIG. 1 is a functional block diagram of a power management system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a power management system according to one embodiment of the present disclosure. Referring to FIG. 1, the power management system is adapted to an electronic device E. The power management system includes an alternative current (AC) power supply 1, a first battery 2, a first charger 3, a second battery 4, a second charger 5, and a control circuit 6. The first charger 3 is electrically connected to the first battery 2, a load L of the electronic device E, the alternative current power supply 1, and the control circuit 6. The load L includes electronic components that require electrical energy in the electronic device E, such as a central processing unit, a graphics processor, and a memory. When tasks processed by the electronic device E become more complex and require more system resources, power consumption of the load L is increased. For example, settings of the central processing unit (CPU) may include a first power limit PL1, a second power limit PL2, a third power limit PL3, a fourth power limit PL4, and other power consumption levels. Here, the first power limit PL1 usually represents thermal design power consumption, and the second power limit PL2 represents short-term power consumption, which is suitable for a full load operation or overclocking at a turbo boost frequency. The second power limit PL2 is maximum power consumption when the central processing unit operates at a high clock speed, so that the second power limit PL2 is usually greater than the first power limit PL1. The third power limit PL3 and the fourth power limit PL4 are modes with relatively higher power consumption.

In addition, the second charger 5 is electrically connected to the second battery 4, the load L of the electronic device E, the AC power supply 1, and the control circuit 6. The first charger 3 can have a first system power, and the first system power is a first stopping threshold (e.g., in watts) that prohibits the AC power supply 1 from continuing to charge the first battery 2. Specifically, when the power consumption of the load L is greater than or equal to the first system power, the AC power supply 1 is prohibited from continuing to charge the first battery 2. Similarly, the second charger 5 can have a second system power, and the second system power is a second stopping threshold (e.g., in watts) that prohibits the AC power supply 1 from continuing to charge the second battery 4. When the power consumption of the load L is greater than or equal to the second system power, the AC power supply 1 is prohibited from continuing to charge the second battery 4.

The control circuit 6 can be implemented by, for example, a micro control unit, a system on a chip, a programmable logic array, or a field programmable logic array. The control circuit 6 is electrically connected to the first charger 3 and the second charger 5. The control circuit 6 is configured to detect a capacity of the first battery 2 and a capacity of the second battery 4, so as to set the first system power of the first charger 3 and the second system power of the second charger 5. For example, the control circuit 6 sets the first system power of the first charger 3 as a first rated power, and the control circuit 6 sets the second system power of the second charger 5 to be lower than the first rated power. Under this condition, there can be a difference between the first system power and the second system power. For example, the difference may be greater than or equal to 5 watts. When the power consumption of the load L increases with time, the AC power supply 1 is first prohibited from continuing to charge the second battery 4. Then, a turbo boost mode of the first charger 3 is enabled by the control circuit 6, so that the AC power supply 1 and the first battery 2 simultaneously supply power to the load L.

In addition, the first system power of the first charger 3 should be slightly less than a rated power of the AC power supply 1. If the first system power is equal to the rated power of the AC power supply 1 and an error of the first charger 3 occurs, the first system power may exceed the rated power of the AC power supply 1 during a charging process, thereby failing to comply with a safety regulation.

In some embodiments, the first charger 3 and the second charger 5 can both operate in a turbo boost mode, so as to allow the AC power supply 1 and batteries that correspond to the first charger 3 and the second charger 5 to simultaneously supply power to the load L. In detail, the control circuit 6 disables the turbo boost mode of the second charger 5 while enabling the turbo boost mode of the first charger 3. When the turbo boost mode of the first charger 3 is enabled, the first charger 3 allows the first battery 2 and the AC power supply 1 to simultaneously supply power to the load L of the electronic device E. When the turbo boost mode of the second charger 5 is disabled, the second charger 5 only allows the AC power supply 1 to provide power to the load L of the electronic device E.

Figure 2:
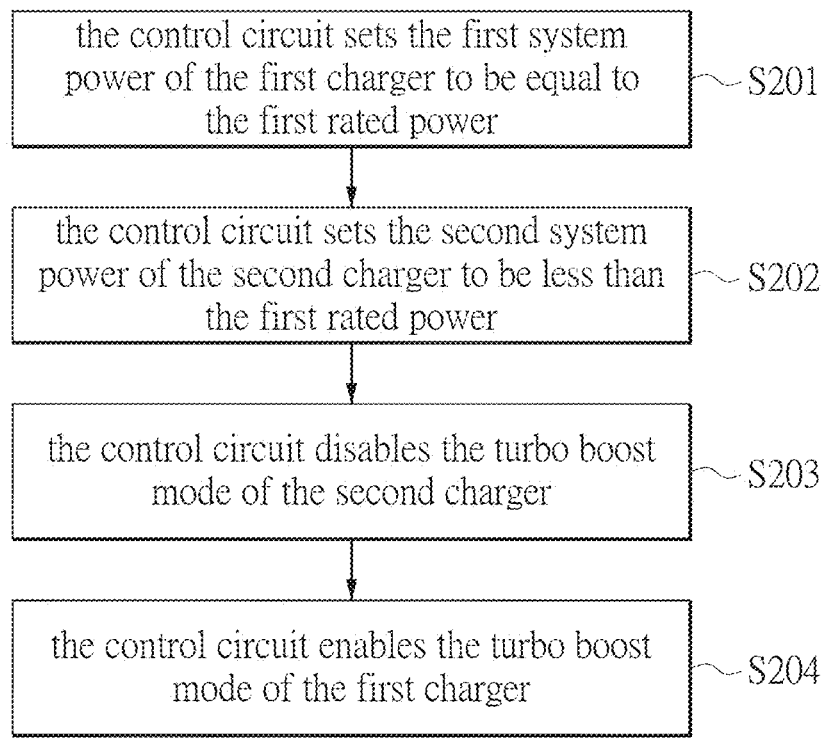
FIG. 2 is a flowchart of a power management method that is adapted to the power management system of FIG. 1 according to a first embodiment of the present disclosure.

FIG. 2 is a flowchart of a power management method that is adapted to the power management system of FIG. 1 according to a first embodiment of the present disclosure. Referring to FIG. 2, in step S201, the control circuit 6 sets the first system power of the first charger 3 to be equal to the first rated power. In step S202, the control circuit 6 sets the second system power of the second charger 5 to be less than the first rated power. In step S203, the control circuit 6 disables the turbo boost mode of the second charger 5. In step S204, the control circuit 6 enables the turbo boost mode of the first charger 3. Specifically, since the second system power is less than the first system power, the power consumption of the load L first rises to the second system power of the second charger 5, and the AC power supply 1 is prohibited from continuing to charge the second battery 4. Furthermore, the control circuit 6 disables the turbo boost mode of the second charger 5. When the power consumption of the load L rises to the first system power of the first charger 3, the AC power supply 1 is prohibited from continuing to charge the first battery 2, and the control circuit 6 enables the turbo boost mode of the first charger 3, so that the AC power supply 1 and the first battery 2 simultaneously supply power to the load L.

Through the power management method of FIG. 2, when the turbo boost mode of the first charger 3 is enabled by the control circuit 6, the AC power supply 1 does not continue to charge the first battery 2 and the second battery 4, so that the load L can obtain stable power for operation.

Figure 3:
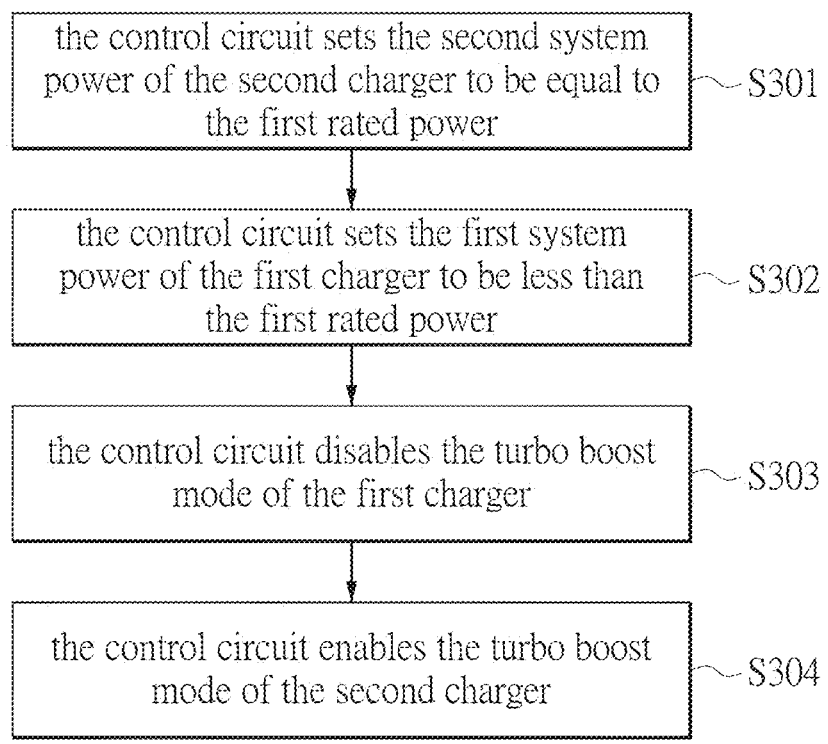
FIG. 3 is a flowchart of the power management method that is adapted to the power management system of FIG. 1 according to a second embodiment of the present disclosure.

FIG. 3 is a flowchart of the power management method that is adapted to the power management system of FIG. 1 according to a second embodiment of the present disclosure. Referring to FIG. 3, in step S301, the control circuit 6 sets the second system power of the second charger 5 to be equal to the first rated power. In step S302, the control circuit 6 sets the first system power of the first charger 3 to be less than the first rated power. In step S303, the control circuit 6 disables the turbo boost mode of the first charger 3. In step S304, the control circuit 6 enables the turbo boost mode of the second charger 5.

Specifically, since the first system power is smaller than the second system power, the power consumption of the load L first rises to the first system power, and the AC power supply 1 is prohibited from continuing to charge the first battery 2. Furthermore, the control circuit 6 disables the turbo boost mode of the first charger 3. When the power consumption of the load L rises to the second system power, the AC power supply 1 is prohibited from continuing to charge the second battery 4, and the control circuit 6 enables the turbo boost mode of the second charger 5, so that the AC power supply 1 and the second battery 4 simultaneously provide power to the load L.

Through the power management method of FIG. 3, when the turbo boost mode of the second charger 5 is enabled, the AC power supply 1 does not continue to charge the first battery 2 and the second battery 4, so that the load L can obtain stable power for operation.

Figures 4, 4A, 4B:
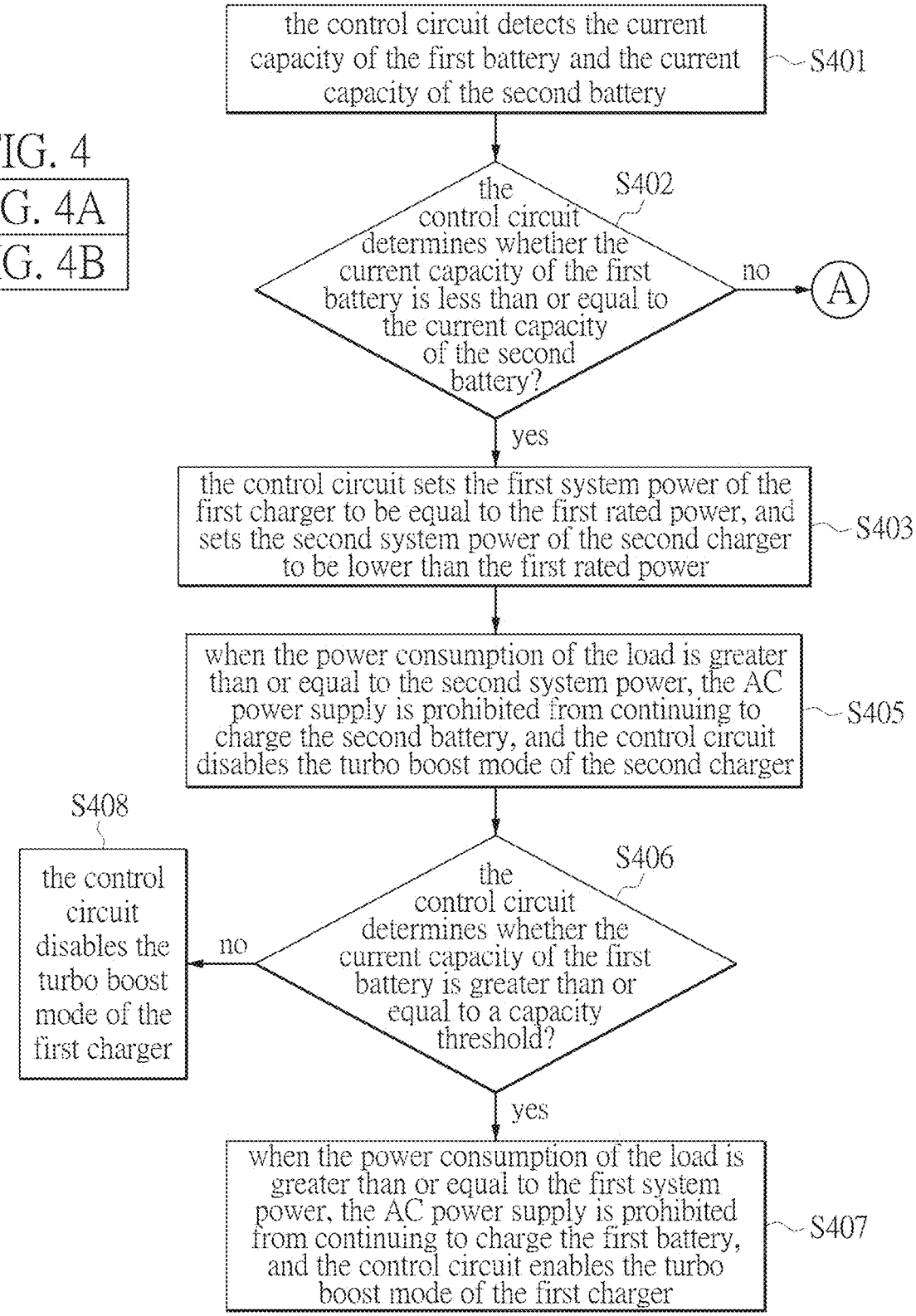
FIGS. 4A and 4B are flowcharts of the power management method that is adapted to the power management system of FIG. 1 according to a third embodiment of the present disclosure.
Figure 4B:
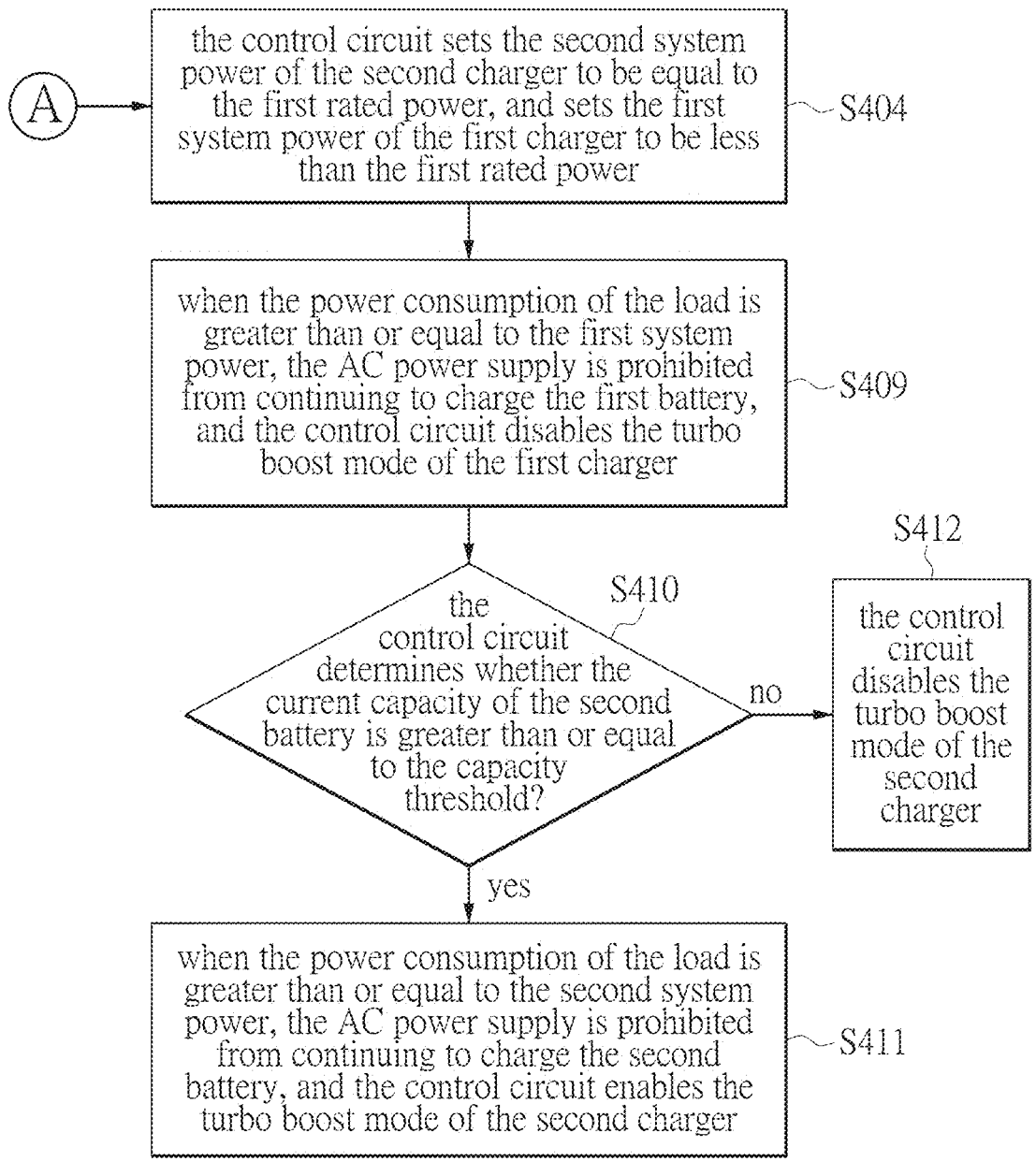

FIGS. 4A and 4B are flowcharts of the power management method that is adapted to the power management system of FIG. 1 according to a third embodiment of the present disclosure. Referring to FIG. 4A, in step S401, the control circuit 6 detects the current capacity of the first battery 2 and the current capacity of the second battery 4. In step S402, the control circuit 6 determines whether the current capacity of the first battery 2 is less than or equal to the current capacity of the second battery 4. When the current capacity of the first battery 2 is less than or equal to the current capacity of the second battery 4, step S402 is followed by step S403. When the current capacity of the first battery 2 is greater than the current capacity of the second battery 4, step S402 is followed by S404.

Referring to FIG. 4A, in step S403, the control circuit 6 sets the first system power of the first charger 3 to be equal to the first rated power, and sets the second system power of the second charger 5 to be lower than the first rated power.

Specifically, the control circuit 6 sets the first system power of the first charger 3 by modifying a register of the first charger 3, and sets the second system power of the second charger 5 by modifying a register of the second charger 5.

Referring to FIG. 4B, in step S404, the control circuit 6 sets the second system power of the second charger 5 to be equal to the first rated power, and sets the first system power of the first charger 3 to be less than the first rated power.

Referring to FIG. 4A, step S403 is followed by step S405. In step S405, when the power consumption of the load L is greater than or equal to the second system power, the AC power supply 1 is prohibited from continuing to charge the second battery 4, and the control circuit 6 disables the turbo boost mode of the second charger 5.

Referring to FIG. 4A, step S405 is followed by step S406. In step S406, the control circuit 6 determines whether the current capacity of the first battery 2 is greater than or equal to a capacity threshold (e.g., 10%). When the current capacity of the first battery 2 is greater than or equal to the capacity threshold, step S406 is followed by step S407. When the current capacity of the first battery 2 is less than the capacity threshold, step S406 is followed by step S408. In step S407, when the power consumption of the load L is greater than or equal to the first system power, the AC power supply 1 is prohibited from continuing to charge the first battery 2, and the control circuit 6 enables the turbo boost mode of the first charger 3. In step S408, the control circuit 6 disables the turbo boost mode of the first charger 3.

Referring to FIG. 4B, step S404 is followed by step S409. In step S409, when the power consumption of the load L is greater than or equal to the first system power, the AC power supply 1 is prohibited from continuing to charge the first battery 2, and the control circuit 6 disables the turbo boost mode of the first charger 3. When the first charger 3 does not enter the turbo boost mode, the first charger 3 only allows the AC power supply 1 to supply power to the load L of the electronic device E.

Referring to FIG. 4B, step S409 is followed by step S410. In step S410, the control circuit 6 determines whether the current capacity of the second battery 4 is greater than or equal to the capacity threshold. When the current capacity of the second battery 4 is greater than or equal to the capacity threshold, step S410 is followed by step S411. When the current capacity of the second battery 4 is less than the capacity threshold, step S410 is followed by step S412. In step S411, when the power consumption of the load L is greater than or equal to the second system power, the AC power supply 1 is prohibited from continuing to charge the second battery 4, and the control circuit 6 enables the turbo boost mode of the second charger 5. When the second charger 5 enters the turbo boost mode, the second charger 5 allows the second battery 4 and the AC power supply 1 to simultaneously supply power to the load L of the electronic device E.

In step S412, the control circuit 6 disables the turbo boost mode of the second charger 5. When the second charger 5 does not enter the turbo boost mode, the second charger 5 only allows the AC power supply 1 to supply power to the load L of the electronic device E.

The difference between the third embodiment of the power management method shown in FIGS. 4A and 4B and the first embodiment of the power management method shown in FIG. 2 is as follows. In the third embodiment, one of the first battery 2 and the second battery 4 with the lower capacity is charged by a large current, and another one of the first battery 2 and the second battery 4 with the higher capacity is charged by a small current. In this way, the charging time can be shortened.

Figure 5A:
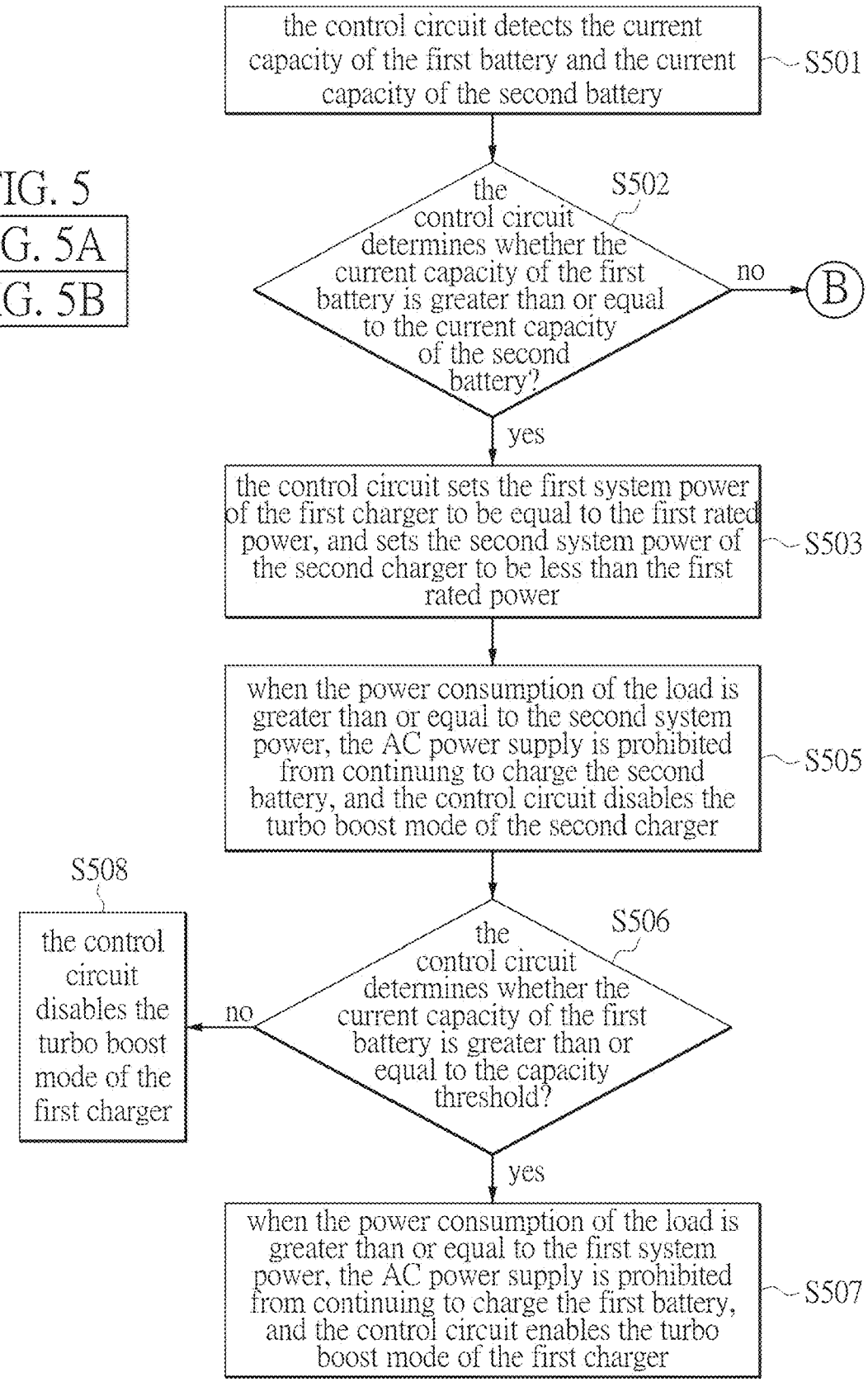
FIGS. 5A and 5B are flowcharts of the power management method that is adapted to the power management system of FIG. 1 according to a fourth embodiment of the present disclosure.
Figure 5B:
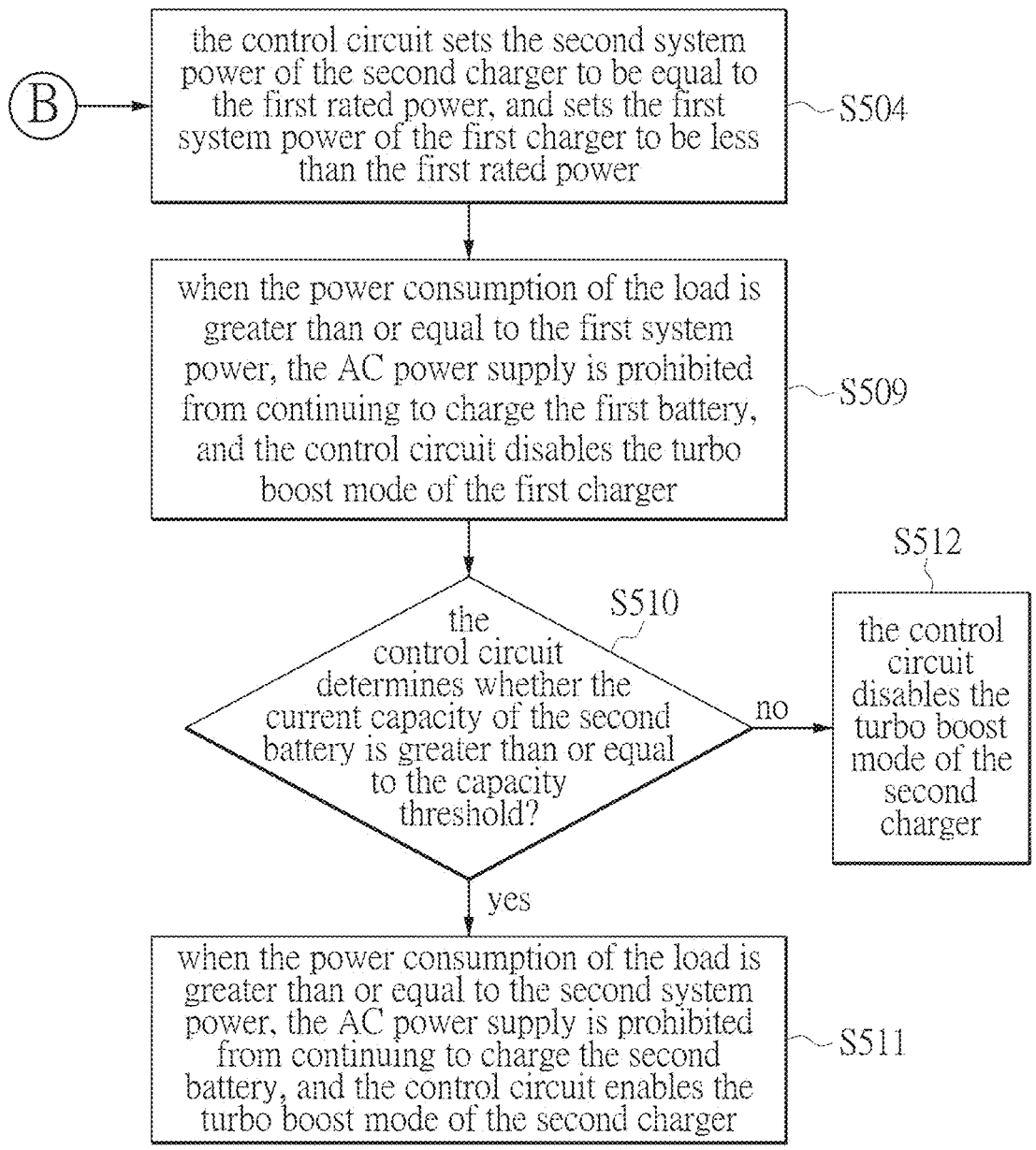

FIGS. 5A and 5B are flowcharts of the power management method that is adapted to the power management system of FIG. 1 according to a fourth embodiment of the present disclosure.

Referring to FIG. 5A, in step S501, the control circuit 6 detects the current capacity of the first battery 2 and the current capacity of the second battery 4. In step S502, the control circuit 6 determines whether the current capacity of the first battery 2 is greater than or equal to the current capacity of the second battery 4. When the current capacity of the first battery 2 is greater than or equal to the current capacity of the second battery 4, step S502 is followed by step S503. When the current capacity of the first battery 2 is less than the current capacity of the second battery 4, step S502 is followed by step S504.

Referring to FIG. 5A, in step S503, the control circuit 6 sets the first system power of the first charger 3 to be equal to the first rated power, and sets the second system power of the second charger 5 to be less than the first rated power.

Referring to FIG. 5B, in step S504, the control circuit 6 sets the second system power of the second charger 5 to be equal to the first rated power, and sets the first system power of the first charger 3 to be less than the first rated power.

Referring to FIG. 5A, step S503 is followed by step S505. In step S505, when the power consumption of the load L is greater than or equal to the second system power, the AC power supply 1 is prohibited from continuing to charge the second battery 4, and the control circuit 6 disables the turbo boost mode of the second charger 5.

Referring to FIG. 5A, step S505 is followed by step S506. In step S506, the control circuit 6 determines whether the current capacity of the first battery 2 is greater than or equal to the capacity threshold. When the current capacity of the first battery 2 is greater than or equal to the capacity threshold, step S506 is followed by step S507. When the current capacity of the first battery 2 is less than the capacity threshold, step S506 is followed by step S508. In step S507, when the power consumption of the load L is greater than or equal to the first system power, the AC power supply 1 is prohibited from continuing to charge the first battery 2, and the control circuit 6 enables the turbo boost mode of the first charger 3. In step S508, the control circuit 6 disables the turbo boost mode of the first charger 3.

Referring to FIG. 5B, step S504 is followed by step S509. In step S509, when the power consumption of the load L is greater than or equal to the first system power, the AC power supply 1 is prohibited from continuing to charge the first battery 2, and the control circuit 6 disables the turbo boost mode of the first charger 3.

Referring to FIG. 5B, step S509 is followed by step S510. In step S510, the control circuit 6 determines whether the current capacity of the second battery 4 is greater than or equal to the capacity threshold. When the current capacity of the second battery 4 is greater than or equal to the capacity threshold, step S510 is followed by step S511. When the current capacity of the second battery 4 is less than the capacity threshold, step S510 is followed by step S512. In step S511, when the power consumption of the load L is greater than or equal to the second system power, the AC power supply 1 is prohibited from continuing to charge the second battery 4, and the control circuit 6 enables the turbo boost mode of the second charger 5.

In step S512, the control circuit 6 disables the turbo boost mode of the second charger 5.

Comparing the fourth embodiment of the power management method shown in FIGS. 5A and 5B and the first embodiment of the power management method shown in FIG. 2, it can be observed that in the fourth embodiment, one of the first battery 2 and the second battery 4 with the higher capacity and the AC power supply 1 simultaneously provide power to the load L of the electronic device E.

In conclusion, in the power management system and the power management method provided by the present disclosure, regardless of which turbo boost mode (of the first charger 3 or the second charger 5) is enabled, the AC power supply 1 does not continue to charge the first battery 2 and the second battery 4, so that the load L can obtain stable power for operation. When the charger in the turbo boost mode is connected to a battery with a lower capacity, the battery with the lower capacity is charged with a larger current, and the other battery with a higher capacity is charged with a smaller current, so that the charging time can be decreased. When the charger in the turbo boost mode is connected to a battery with a higher capacity, the battery with the higher capacity provides power to the load, so that the load can obtain sufficient power. Regardless of which turbo boost mode (of the first charger 3 or the second charger 5) is enabled, the AC power supply 1 does not charge the battery. Therefore, even if the first power limit PL1, the second power limit PL2, and the fourth power limit PL4 of the central processing unit are not reduced, the central processing unit can still obtain stable power for operation, thereby optimizing the system performance of the electronic device E.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power management system, which is adapted to an electronic device, the power management system comprising:
   an alternative current power supply;
   a first battery;
   a first charger electrically connected to the first battery, the electronic device, and the alternative current power supply;
   a second battery;
   a second charger electrically connected to the second battery, the electronic device, and the alternative current power supply; and
   a control circuit electrically connected to the first charger and the second charger, wherein the control circuit is configured to detect capacities of the first battery and the second battery, to set a first system power of the first charger as a first rated power, and to set a second system power of the second charger to be lower than the first rated power;
   wherein the control circuit enables a turbo boost mode of the first charger and disables a turbo boost mode of the second charger.

2. The power management system according to claim 1, wherein when a current capacity of the first battery is greater than or equal to a capacity threshold, the control circuit is configured to enable the turbo boost mode of the first charger; wherein when the current capacity of the first battery is less than the capacity threshold, the control circuit is configured to disable the turbo boost mode of the first charger; wherein when the current capacity of the first battery is lower than a current capacity of the second battery, the control circuit is configured to disable the turbo boost mode of the second charger.

3. The power management system according to claim 1, wherein when the first charger enters the turbo boost mode, the first charger allows the first battery and the alternative current power supply to simultaneously provide power to the electronic device; wherein when the first charger does not enter the turbo boost mode, the first charger allows the alternative current power supply to provide the power to the electronic device.

4. The power management system according to claim 1, wherein when a current capacity of the first battery is greater than a current capacity of the second battery, the control circuit is configured to disable the turbo boost mode of the second charger; wherein when the current capacity of the first battery is equal to the current capacity of the second battery, the control circuit is further configured to enable the turbo boost mode of the first charger or the turbo boost mode of the second charger.

5. The power management system according to claim 1, wherein a difference between the first system power and the second system power is greater than or equal to 5 watts.

6. A power management method, which is adapted to an electronic device, the power management method comprising:
configuring a control circuit to perform following:
setting a first system power of a first charger to be equal to a first rated power;
setting a second system power of a second charger to be less than the first rated power;
enabling a turbo boost mode of the first charger; and disabling a turbo boost mode of the second charger;
detecting a current capacity of a first battery connected to the first charger and a current capacity of a second battery connected to the second charger; and
enabling the turbo boost mode of the first charger when the current capacity of the first battery is greater than or equal to a capacity threshold; and disabling the turbo boost mode of the first charger when the current capacity of the first battery is less than the capacity threshold.

7. The power management method according to claim 6, further comprising:
configuring the control circuit to set the first system power to be equal to the first rated power; and
setting the second system power to be less than the first rated power when the current capacity of the first battery connected to the first charger is less than the current capacity of the second battery connected to the second charger.

8. The power management method according to claim 6, further comprising:
configuring the control circuit to set the first system power to be equal to the first rated power; and
setting the second system power to be less than the first rated power when the current capacity of the first battery connected to the first charger is greater than the current capacity of the second battery connected to the second charger.

9. The power management method according to claim 6, further comprising:
configuring the first charger to allow the first battery connected to the first charger and an alternative current power supply to simultaneously provide power to the electronic device when the first charger enters the turbo boost mode; and
configuring the first charger to only allow the alternative current power supply to provide the power to the electronic device when the first charger does not enter the turbo boost mode.

10. A power management method, which is adapted to an electronic device, the power management method comprising:
configuring a control circuit to perform following:
setting a first system power of a first charger to be equal to a first rated power;
setting a second system power of a second charger to be less than the first rated power;
enabling a turbo boost mode of the first charger; and disabling a turbo boost mode of the second charger;
configuring the first charger to allow a first battery connected to the first charger and an alternative current power supply to simultaneously provide power to the electronic device when the first charger enters the turbo boost mode; and
configuring the first charger to only allow the alternative current power supply to provide the power to the electronic device when the first charger does not enter the turbo boost mode.

11. The power management method according to claim 10, further comprising:
configuring the control circuit to set the first system power to be equal to the first rated power; and
setting the second system power to be less than the first rated power when a current capacity of the first battery connected to the first charger is less than a current capacity of a second battery connected to the second charger.

12. The power management method according to claim 10, further comprising:
configuring the control circuit to set the first system power to be equal to the first rated power; and
setting the second system power to be less than the first rated power when a current capacity of the first battery connected to the first charger is greater than a current capacity of a second battery connected to the second charger.

* * * * *